Figure 1:
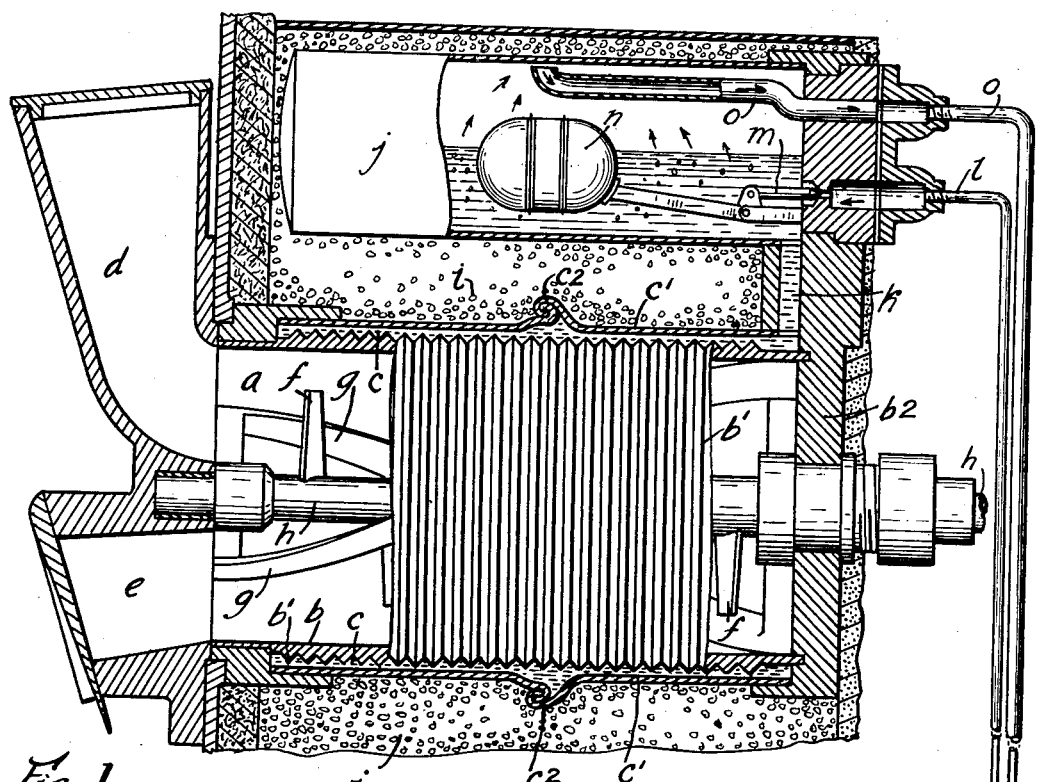

Inventors:
Chester A. Harsch
Dale A. Fingerhooth

Patented Feb. 16, 1937

2,070,729

UNITED STATES PATENT OFFICE 2,070,729

APPARATUS FOR COOLING AND FREEZING FOOD PRODUCTS

Chester A. Harsch and Dale A. Fingerhooth, Portland, Oreg.

Application July 26, 1935, Serial No. 33,351

8 Claims. (Cl. 62—114)

Our invention relates to machines or apparatuses for cooling and freezing liquids, particularly to apparatus for making ice-cream, sherbets, and other frozen food products. Machines of this type in common use fall generally into two classes, namely; those in which the freezing is done wholly or partly by the expansion of a liquid refrigerant, the contact of the expanding gases with the outside of the wall of the freezing chamber causing the freezing of the contents within said chamber; and, second, those in which the freezing is done by brine which is caused to circulate about the freezing chamber, the temperature of the brine being first lowered by suitable ordinary mechanical refrigerating means.

More specifically, our invention relates to ice-cream machines for use in a store so as to permit ice-cream to be frozen rapidly as ordered by customers. A definite need has developed for ice-cream machines suitable for this purpose which can perform the freezing operation in the shortest possible time, and many modifications in ice-cream machines of the two types previously mentioned have heretofore been made in the effort to cut down the period of time required for the freezing, and thus the period during which the customer must wait for the preparation of his ice-cream to order.

We attain the said primary object of our invention—of speeding up the freezing process—by producing a freezing apparatus in which the freezing chamber is completely immersed in the liquid refrigerant at all times, thus working on a different principle than either of said prior types of ice-cream freezers. In order to distinguish our invention we call it a "full-flooded" type of freezer. We have discovered that the said distinguishing feature of our invention, namely, causing the freezing chamber to be immersed in, or completely surrounded by the liquid refrigerant at all times, instead of having chilled brine surround the freezing chamber, or instead of having the chilled gases from the liquid refrigerant surround such chamber, effects a much more rapid freezing of the contents in the freezing chamber, and results in more efficient operation of the freezer in general.

A further object of our invention is therefore to provide an apparatus or mechanical freezer so constructed that the liquid refrigerant will surround the walls of the freezing chamber continuously at all times, and not merely be sprayed on the walls of the freezing chamber, and furthermore an apparatus in which the gases will be permitted to escape from the liquid refrigerant enveloping the refrigerating chamber into a separate expansion or "tail-off" chamber located apart.

We have discovered further that, in order to attain most efficient results, the amount of liquid refrigerant surrounding the freezing chamber must be constantly maintained at sufficient volume; otherwise the escaping gases will partly replace the refrigerant surrounding the freezing chamber, and thus cause our freezer to operate less efficiently similarly to one of the former types of ice-cream freezers above referred to. On the other hand, if too great a volume of liquid refrigerant is permitted to surround the freezing chamber the speed of the freezing will be substantially reduced, owing to the fact that, under the same conditions, a relatively longer period is required to lower the temperature of a larger volume of refrigerant than of a smaller volume, and to attain the most rapid freezing the cooling medium surrounding the freezing chamber must be reduced to the lowest possible temperature in the shortest space of time. We have found that most efficient results are obtained when a thin blanket-like volume of the liquid refrigerant of not greater thickness than one-half an inch surrounds the freezing chamber.

We attain the primary object of our invention by producing a freezer in which just the right limited volume of liquid refrigerant will constantly envelop the freezing chamber at all times, so as to produce the desired maximum speed and efficiency in freezing.

Figure 3:
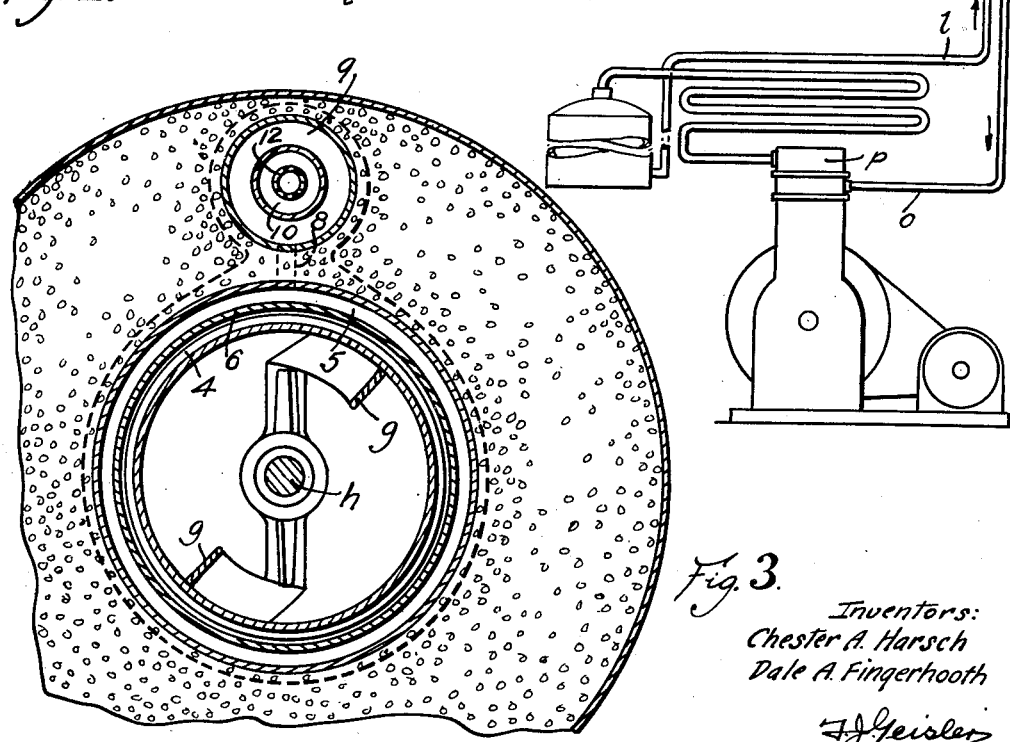
Figure 2:
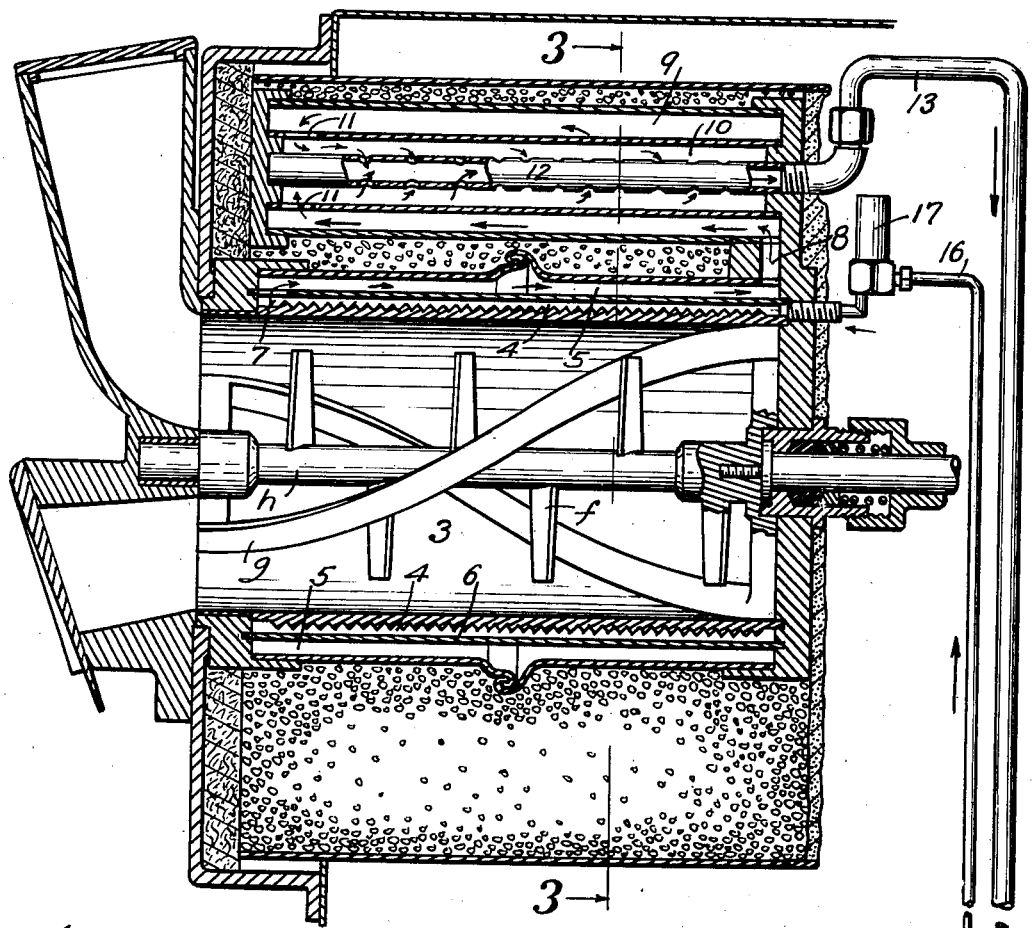
Figure 2:
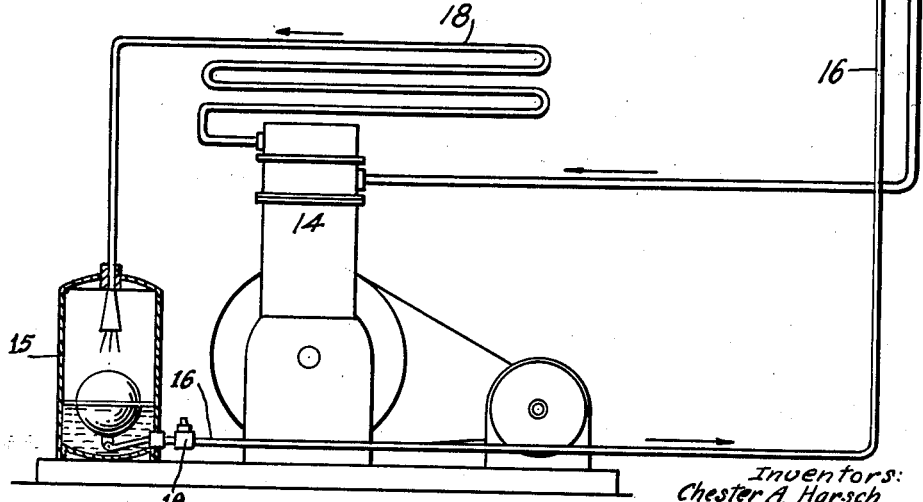

The further details for carrying our invention into practice, and the apparatus convenient to use for such purpose, are hereinafter fully described with reference to the accompanying drawings, in which Fig. 1 is a longitudinal vertical section of the main part of our freezer or apparatus showing the freezing chamber, the surrounding chamber for the liquid refrigerant, the separate expansion chamber connected to the freezing chamber for the gases escaping from the liquid refrigerant, and including, diagrammatically, the compressor controlling the circulation of the liquid refrigerant;

Fig. 2 is a similar longitudinal section of a modification of our freezer, including a supplementary chamber for liquid refrigerant; and Fig. 3 is a fragmentary transverse section on the line 3—3 of Fig. 2, which also serves, incidentally, as an aid to an understanding of our apparatus as illustrated by Fig. 2.

Referring first to Fig. 1, *a* indicates the freezing chamber which comprises a cylindrical metal wall $b$, the outer surface of which is made with corrugations $b'$ in order to increase the extent of surface contact between the wall $b$ and the encompassing liquid refrigerant contained in the surrounding cylindrical chamber $c$. The freezing chamber $a$ is provided with a filling neck $d$ thru which the cream or other liquid to be cooled or frozen is poured into the freezing chamber, and the latter is also provided with a delivery channel $e$ for discharging the contents from the freezing chamber after the desired cooling or freezing. The freezing chamber $a$ is provided with the usual paddles $f$, and wipers $g$ carried by a central shaft $h$, which is rotated by suitable mechanical means, not shown, for the purpose of beating the mixture during the cooling or freezing process. The surrounding chamber $c$, containing the liquid refrigerant, comprises a cylindrical wall $c'$, which is preferably made with an expansion joint $c2$ in order to permit variation in the length of the wall $c'$, occasioned by temperature changes, without disturbing connections between such cylindrical wall $c'$ and the supporting end walls $b2$. The chamber $c$ containing the liquid refrigerant is surrounded with suitable insulation, such as cork, indicated by $i$. $j$ denotes the expansion chamber which is connected with the refrigerant chamber $c$ by the pipe or passageway $k$; the expansion chamber $j$ being preferably cylindrical in shape, altho any other convenient shape may be substituted if desired.

Liquid refrigerant enters the expansion chamber $j$ thru the pipe $l$ connected to the storage chamber of a compressor of the usual type, said compressor being diagrammatically shown at $p$. A valve $m$, operated by a float $n$, controls the inlet from pipe $l$ into chamber $j$, the said float $n$ operating to close the valve $m$ and prevent further liquid refrigerant entering chamber $j$ when the liquid refrigerant within that chamber has reached a predetermined level. Since the liquid refrigerant is thus maintained at a predetermined constant level in expansion chamber $j$, the refrigerant chamber $c$, connected to chamber $j$ by pipe $k$, will always be filled with liquid refrigerant. In other words, liquid refrigerant will always surround the freezing chamber $a$. At the same time, when the compressor is in operation, the gases escaping from the liquid refrigerant in chamber $c$ are permitted freely to pass up thru the pipe $k$ to the top of expansion chamber $j$ while additional liquid refrigerant constantly enters chamber $c$ to replace that which escapes in the form of gas. The corrugations $b'$ on the outside of the wall $b$ of the freezing chamber $a$ (which wall also constitutes the inside wall of chamber $c$) aid further in the passage of the gases from the liquid refrigerant about such wall to the top of refrigerant chamber $c$ and thence thru pipe $k$ to expansion chamber $j$.

An outlet pipe $o$, having its entrance near the top of expansion chamber $j$, is connected to the suction side of the compressor $p$, thus causing the gases from the top of chamber $j$ to be drawn off thru pipe $o$ by the action of the compressor, when in operation.

We have found that most efficient results are obtained when there is only a relatively small volume of the liquid refrigerant surrounding the freezing chamber $a$, but, at the same time, it is necessary in our method to have the refrigerant chamber $c$ always completely filled by the liquid refrigerant. By making the space between the outer and inner cylindrical walls of the refrigerant chamber $c$ small in cross section (preferably less than one-half an inch) we succeed in obtaining the best results, since by such construction we are able to limit the capacity of chamber $c$ to the required volume insuring the most rapid freezing. The rapid expansion of the thin wall of liquid refrigerant in the refrigerant chamber $c$ causes the temperature of such refrigerant to be rapidly reduced to the very low degree required for the quick cooling or freezing of the contents within the freezing chamber $a$. The maintenance of the constant level of the refrigerant in expansion chamber $j$ by the float valve $m$ insures the keeping of the refrigerant chamber $c$ filled with refrigerant notwithstanding the small capacity of the chamber, and of the rapidity with which the refrigerant expands and passes off into gas. When the compressor $p$ is not in operation back pressure of accumulating gases develops in the expansion chamber $j$ and prevents further expansion of the liquid refrigerant in chamber $c$ and in the bottom of chamber $j$.

In Fig. 2 the freezing chamber 3, which corresponds to the freezing chamber $a$ of Fig. 1, is surrounded by two concentric chambers 4 and 5, which are separated from each other by the cylindrical wall 6, the said chambers, however, being connected by an opening 7 at the top of said wall. The outer of these two chambers 5 is in turn connected by a pipe 8 to the annular expansion chamber 9. The expansion chamber 9 incloses a centrally located second chamber 10 connected with chamber 9 by the ports or openings 11; and finally within chamber 10 is a perforated pipe 12 which is joined to pipe 13, the latter in turn being connected to the suction side of the compressor.

In the compressor apparatus, which is indicated in Fig. 2, and which is of the usual type, 15 indicates a storage chamber, or, what is technically known as a "high-side float" chamber. This high-side float chamber is provided with the usual float valve 19 controlling the outlet from said chamber, causing such outlet to be closed whenever the level of liquid in chamber 15 falls too low. The liquid refrigerant under pressure in this high-side float chamber 15 passes thru pipe 16 and the weighted check valve 17 (which is also of well-known type) to the chambers 4 and 5. Sufficient liquid refrigerant is sealed up in this apparatus to cause the chambers 4 and 5 normally to be filled at all times. When the cooling of the liquid or freezing of the ice-cream has been completed and the compressor 14 is stopped, the cutting off of the suction into pipe 13 will occasion pressure of accumulating gases within connecting chambers 10 and 9 which in turn will cause back pressure thru refrigerant chambers 5 and 4 to the weighted check valve 17, and this back pressure will close valve 17 and prevent the passage of refrigerant through it in either direction as soon as such back pressure rises to a predetermined amount below the pressure in pipe 16 and storage chamber 15. Thus when the compressor 14 is not in operation liquid refrigerant is retained under pressure in the chambers 4 and 5, and is prevented by the said pressure from expanding.

In the modified construction illustrated by Figs. 2 and 3 we make chamber 4, surrounding the freezing chamber 3, of the same capacity and cross section as that of refrigerant chamber $c$ in Fig. 1; that is to say of just sufficient capacity for the volume of liquid refrigerant necessary to produce most efficient results. The purpose of the outer surrounding chamber 5 is both to provide an adequate reserve supply of the liquid refrigerant—thus taking the place of the refrigerant and float valve in chamber *j* of Fig. 1—and also to aid in the cooling of the inner refrigerant chamber 4.

As already mentioned, when the compressor is in operation the escaping gases from the liquid refrigerant in chamber 4 and chamber 5 pass thru pipe 8 into expansion chamber 9 and thence into expansion chamber 10, and finally into the pipe 12, by which time the gases have become practically dry, and are thus ready to be drawn off into the suction side of the compressor 14. There is an advantage in having these gases take the relatively long course before being drawn into pipe 13, in that any loss of the cooling effect of these escaping gases is prevented. In the compressor 14, as is well-known, these drawn off gases are again compressed into liquid, then forced thru cooling coils 18 and delivered to the high-side float chamber 15. The liquid refrigerant then is again forced thru pipe 16 and delivered to chambers 4 and 5, as already explained, where it is allowed once more to expand and pass off into gas, and thus the cycle of action is repeated.

While we have described our apparatus in connection with the freezing of ice-cream and similar products, it is not limited to this use alone, but may be used very satisfactorily for the rapid cooling and mixing of milk shakes and other beverages if these are not permitted to remain in the freezing chamber long enough for actual freezing to take place.

We claim:

1. An apparatus for cooling and freezing food products including a compressor; a freezing chamber; a jacket encompassing the walls of said freezing chamber, the annular space inclosed by said jacket about the freezing chamber having a small cross section, said inclosed space constituting a refrigerant holding chamber and being adapted to hold only a relatively small volume of refrigerant; means, including a control valve, for keeping the space inclosed by said jacket constantly filled with liquid refrigerant while the apparatus is operating, said refrigerant holding chamber being divided into two, outer and inner, connected, concentric annular sections; an expansion chamber apart from said annular sections of said refrigerant holding chamber but connected therewith by a passage permitting gases emitted by the refrigerant to pass freely into said expansion chamber, said expansion chamber composed of two annular concentric connected sections which inclose, and are connected with a central space; a perforated pipe located in such space, said pipe connected to the suction side of the compressor.

2. An apparatus for cooling and freezing food products including a compressor; a freezing chamber; a jacket encompassing the walls of said freezing chamber, the annular space inclosed by said jacket about the freezing chamber having a cross section not exceeding approximately one-half inch, said inclosed space constituting a refrigerant holding chamber and being adapted to hold only a relatively small volume of refrigerant; means, including a control valve, for keeping the space inclosed by said jacket constantly filled with liquid refrigerant while the apparatus is operating, said refrigerant holding chamber being divided into two, outer and inner, connected, concentric annular sections; an expansion chamber apart from said annular sections of said refrigerant holding chamber but connected therewith by a passage permitting gases emitted by the refrigerant to pass freely into said expansion chamber, said expansion chamber composed of two annular concentric connected sections which inclose, and are connected with a central space, a perforated pipe located in such space, said pipe connected to the suction side of the compressor, the connection between the pressure side of the compressor and said refrigerant holding chamber including a weighted check valve.

3. An apparatus for cooling and freezing liquid foods including a compressor, a cylindrical freezing chamber, a beater within said freezing chamber, a jacket encompassing the walls of said freezing chamber, the annular space inclosed by said jacket about said freezing chamber having a small cross-section, said inclosed annular jacketed space constituting a refrigerant holding chamber adapted to hold a small volume of liquid refrigerant, means for delivering liquid refrigerant from the high side of said compressor to said jacketed space and for keeping said jacketed space filled with liquid refrigerant at all times and for preventing the draining of the liquid refrigerant from said jacketed space, an expansion chamber associated with and located directly above said jacketed space and connected therewith by a short passage permitting gases when escaping from the refrigerant in said jacketed space to pass freely into said expansion chamber, said expansion chamber connected to the suction side of said compressor, whereby the expansion of said liquid refrigerant will occur automatically within said jacketed space whenever said compressor is operating, but will automatically be prevented within said jacketed space when said compressor is inoperative.

4. An apparatus for cooling and freezing liquid foods including a compressor, a cylindrical freezing chamber, a beater within said freezing chamber, a jacket encompassing the walls of said freezing chamber, the annular space inclosed by said jacket about said freezing chamber having a small cross-section, said inclosed space constituting a refrigerant holding chamber adapted to hold a small volume of liquid refrigerant, an expansion chamber located above said refrigerant holding chamber but connected therewith by a passage permitting gases, when escaping from the refrigerant in said refrigerant holding chamber, to pass into said expansion chamber, said passage entering said expansion chamber at the bottom, means for delivering liquid refrigerant from the high side of said compressor to the bottom of said expansion chamber, a float valve in said expansion chamber adapted to prevent further delivery of liquid refrigerant from the high side of said compressor when the liquid refrigerant in the bottom of said expansion chamber has reached a pre-determined level, a connection fom the top of said expansion chamber to the suction side of said compressor, whereby said refrigerant holding chamber will be filled with liquid refrigerant at all times, and said liquid refrigerant will automatically be permitted to expand whenever said compressor is operating, but will automatically be prevented from expanding when said compressor is inoperative.

5. An apparatus for cooling and freezing liquid foods including a compressor, a cylindrical freezing chamber, a beater within said freezing chamber, a jacket encompassing the walls of said freezing chamber, the annular space inclosed by said jacket about said freezing chamber having a small cross-section, said inclosed space constituting a refrigerant holding chamber adapted to hold a small volume of liquid refrigerant, said refrigerant holding chamber being divided into two, outer and inner, concentric, annular sections, a connection between said sections, means for delivering liquid refrigerant from the high side of said compressor to said refrigerant holding chamber, an expansion chamber located above said refrigerant holding chamber but connected therewith by a passage permitting gases, when escaping from the refrigerant in said refrigerant holding chamber, to pass into said expansion chamber, said expansion chamber connected to the suction side of said compressor, whereby said refrigerant holding chamber will be filled with liquid refrigerant at all times, and said liquid refrigerant will automatically be permitted to expand whenever said compressor is operating, but will automatically be prevented from expanding when said compressor is inoperative.

6. An apparatus for cooling and freezing liquid foods including a compressor, a cylindrical freezing chamber, a beater within said freezing chamber, a jacket encompassing the walls of said freezing chamber, the annular space inclosed by said jacket about said freezing chamber having a small cross-section, said inclosed space constituting a refrigerant-holding chamber adapted to hold a small volume of liquid refrigerant, said refrigerant holding chamber being divided into two, outer and inner, concentric, annular sections, a connection between said sections at the top, means for delivering liquid refrigerant from the high side of said compressor to the inner of said concentric sections, an expansion chamber located above said refrigerant holding chamber but connected to the outer of said concentric sections by a passage permitting gases, when escaping from the refrigerant in said refrigerant holding chamber, to pass into said expansion chamber, said expansion chamber connected to the suction side of said compressor, whereby the inner of said concentric sections will be filled with liquid refrigerant at all times, and said liquid refrigerant will automatically be permitted to expand whenever said compressor is operating, but will automatically be prevented from expanding when said compressor is inoperative.

7. An apparatus for cooling and freezing liquid foods including a compressor, a cylindrical freezing chamber, a beater within said freezing chamber, a jacket encompassing the walls of said freezing chamber, the annular space inclosed by said jacket about said freezing chamber having a small cross-section, said inclosed space constituting a refrigerant holding chamber adapted to hold a small volume of liquid refrigerant, said refrigerant holding chamber being divided into two, outer and inner, concentric, annular sections, a connection between said sections at the top, means for delivering liquid refrigerant from the high side of said compressor to the inner of said concentric sections, said means including a storage chamber connected to the high side of said compressor, a pipe connecting said storage chamber and said inner concentric section, a float-valve in said storage chamber controlling the outlet into said pipe and a weighted check valve in said pipe, an expansion chamber located above said refrigerant holding chamber but connected to the outer of said concentric sections by a passage permitting gases, when escaping from the refrigerant in said refrigerant holding chamber, to pass into said expansion chamber, said passage entering said expansion chamber at the bottom, said expansion chamber connected to the suction side of said compressor, whereby the inner of said concentric sections will be filled with liquid refrigerant at all times, and said liquid refrigerant will automatically be permitted to expand whenever said compressor is operating, but will automatically be prevented from expanding when said compressor is inoperative.

8. An apparatus for cooling and freezing liquid foods including a compressor, a cylindrical freezing chamber, a beater within said freezing chamber, a jacket encompassing the walls of said freezing chamber, the annular space inclosed by said jacket about said freezing chamber having a small cross-section, said inclosed space constituting a refrigerant-holding chamber adapted to hold a small volume of liquid refrigerant, said refrigerant holding chamber being divided into two, outer and inner, concentric, annular sections, a connection between said sections at the top, means for delivering liquid refrigerant from the high side of said compressor to said refrigerant holding chamber, an expansion chamber above said refrigerant holding chamber but connected therewith by a passage permitting gases, when escaping from the refrigerant in said refrigerant holding chamber, to pass into said expansion chamber, said passage entering said expansion chamber at the bottom, said expansion chamber composed of two annular concentric connected sections which inclose and are connected with a central space, a perforated pipe located in such space, said perforated pipe connected to the suction side of said compressor, whereby said refrigerant holding chamber will be filled with liquid refrigerant at all times, and said liquid refrigerant will automatically be permitted to expand whenever said compressor is operating, but will automatically be prevented from expanding when said compressor is inoperative.

CHESTER A. HARSCH.
    DALE A. FINGERHOOTH.